US007308849B2

(12) United States Patent
Schoetz et al.

(10) Patent No.: US 7,308,849 B2
(45) Date of Patent: Dec. 18, 2007

(54) HIGH-PRESSURE PUMP, IN PARTICULAR FOR A FUEL INJECTION DEVICE OF AN INTERNAL COMBUSTION ENGINE

(75) Inventors: Alfons Schoetz, Ditzingen (DE); Walter Fuchs, Stuttgart (DE); Gerhard Meier, Schorndorf (DE); Jochen Aleker, Stuttgart (DE); Andreas Dutt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 10/579,846

(22) PCT Filed: Sep. 14, 2004

(86) PCT No.: PCT/DE2004/002039

§ 371 (c)(1),
(2), (4) Date: May 17, 2006

(87) PCT Pub. No.: WO2005/052367

PCT Pub. Date: Jun. 9, 2005

(65) Prior Publication Data

US 2007/0071620 A1 Mar. 29, 2007

(30) Foreign Application Priority Data

Nov. 25, 2003 (DE) ................................ 103 55 027

(51) Int. Cl.
*F01B 1/00* (2006.01)
*F16J 1/10* (2006.01)

(52) U.S. Cl. ............................................. 92/129; 92/72

(58) Field of Classification Search .................... 92/72, 92/73, 129; 417/471
See application file for complete search history.

(56) References Cited

U.S. PATENT DOCUMENTS

| | | | | |
|---|---|---|---|---|
| 5,567,134 | A | 10/1996 | Inoue | |
| 5,752,430 | A | 5/1998 | Kawajiri et al. | |
| 6,951,165 | B2 * | 10/2005 | Kuhn et al. | 92/129 |
| 7,011,012 | B2 * | 3/2006 | Hartsleben et al. | 92/153 |

FOREIGN PATENT DOCUMENTS

| | | |
|---|---|---|
| DE | 195 22 306 A1 | 1/1996 |
| DE | 101 57 076 A1 | 5/2003 |
| JP | 2000-145572 | 5/2000 |
| JP | 2002-31017 | 1/2002 |

* cited by examiner

*Primary Examiner*—Michael Leslie
(74) *Attorney, Agent, or Firm*—Ronald E. Greigg

(57) ABSTRACT

A high-pressure pump has at least one pump element including a pump piston defining a work chamber and driven at least indirectly by a drive shaft in a reciprocating motion, counter to the force of a restoring spring. The pump piston is braced on the drive shaft at least indirectly via a sleevelike tappet, and the restoring spring engages at least the pump piston. A support element in the tappet braces the pump piston toward the drive shaft and is braced at least indirectly on the drive shaft. The restoring spring, via a spring plate, engages the pump piston and the tappet. The spring plate is elastically deformable in the direction of motion of the pump piston in such a way that as a result of its elastic deformation, deviations in the position of its contact faces on the pump piston and on the tappet are compensated for.

20 Claims, 2 Drawing Sheets

Figure 1:
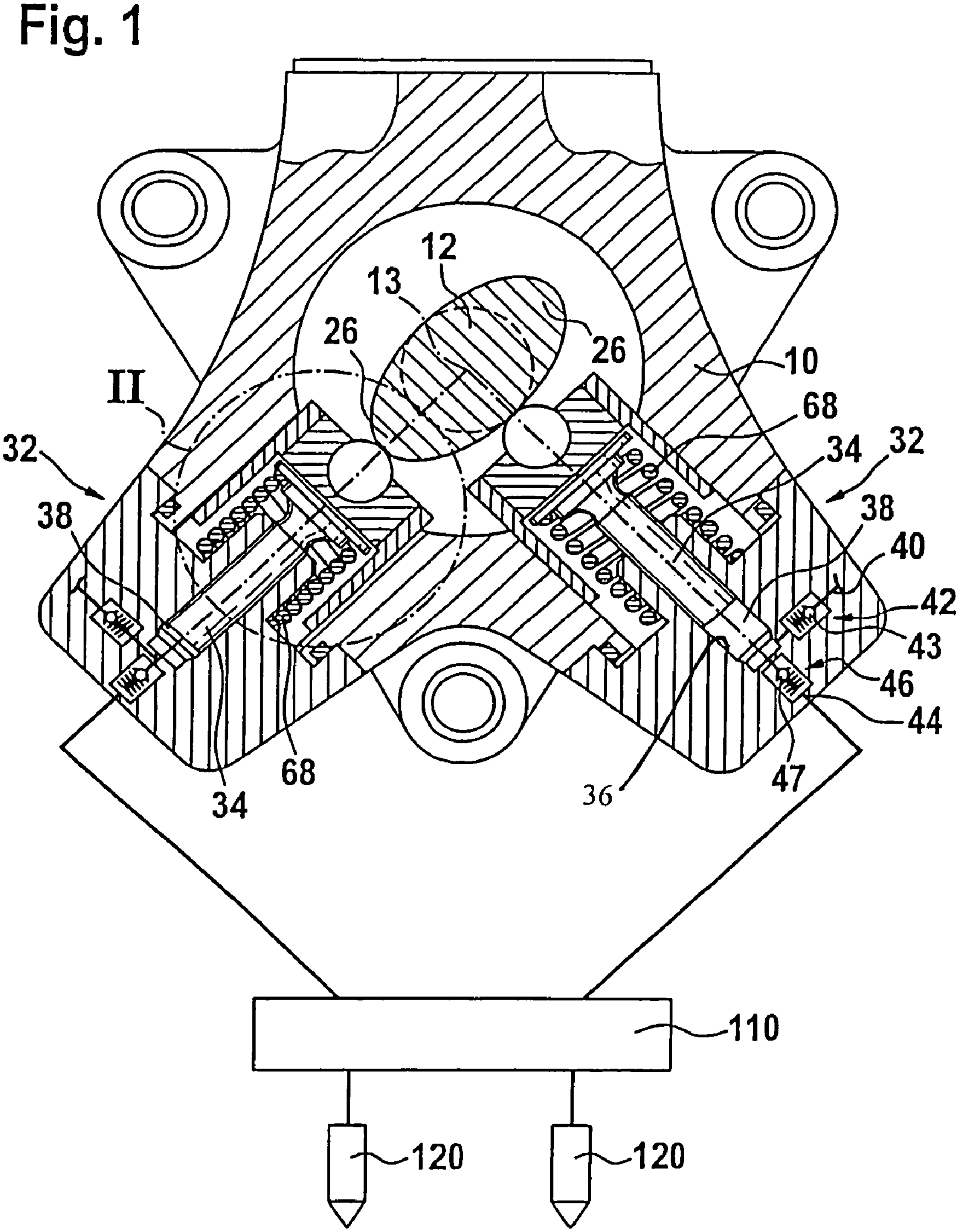

HIGH-PRESSURE PUMP, IN PARTICULAR FOR A FUEL INJECTION DEVICE OF AN INTERNAL COMBUSTION ENGINE

CROSS-REFERENCE TO RELATED APPLICATIONS

This application is a 35 USC 371 application of PCT/DE 2004/002039 filed on Sep. 14, 2004.

BACKGROUND OF THE INVENTION

1. Field of the Invention

The invention is directed to an improved high-pressure pump, in particular for a fuel injection device of an internal combustion engine.

2. Description of the Prior Art

One high-pressure pump for a fuel injection device of an internal combustion engine, known from German Patent Disclosure DE 198 44 326 A1, has a plurality of pump elements, which each have one pump piston that defines a pump work chamber. The pump piston is driven in a reciprocating motion, counter to the force of a restoring spring, by a drive shaft that is driven to rotate. The pump piston is braced at least indirectly on the drive shaft via a sleevelike tappet, and the tappet is guided in a bore in a housing of the high-pressure pump in the direction of motion of the pump piston. The restoring spring is braced at least indirectly on the pump piston and on the tappet. The restoring spring is intended to keep both the pump piston in contact with the tappet and the tappet in contact with the drive shaft. The tappet must take on both the function of transverse force absorption for the pump piston and the function of bracing on the drive shaft. Particularly when the bracing of tappet on the drive shaft is effected via a roller supported in the drive shaft, the result is a complex embodiment of the tappet, which may for instance be embodied as a cast or forged part and has a high weight. The attempt is therefore made to split up the functions of guidance and transverse force absorption for the pump piston and the bracing on the drive shaft to separate components. The restoring spring is intended to act on all of the components, but this is made more difficult because of the production tolerances of the components. If there is play between the components, this play is overcome, particularly in the regions of the reversal of motion of the pump piston, or in other words at its inner and outer dead centers; as a result, the components hit one another, causing increased wear of these components.

SUMMARY AND ADVANTAGES OF THE INVENTION

The high-pressure pump of the invention has the advantage over the prior art that the function of transverse force absorption by the tappet and the function of bracing on the drive shaft are performed by the support element, and because of the elastically deformable spring plate, bracing of the restoring spring on the pump piston and on the tappet is assured regardless of production tolerances of these components.

Advantageous features and refinements of the high-pressure pump of the invention are disclosed.

BRIEF DESCRIPTION OR THE DRAWINGS

Figure 2:
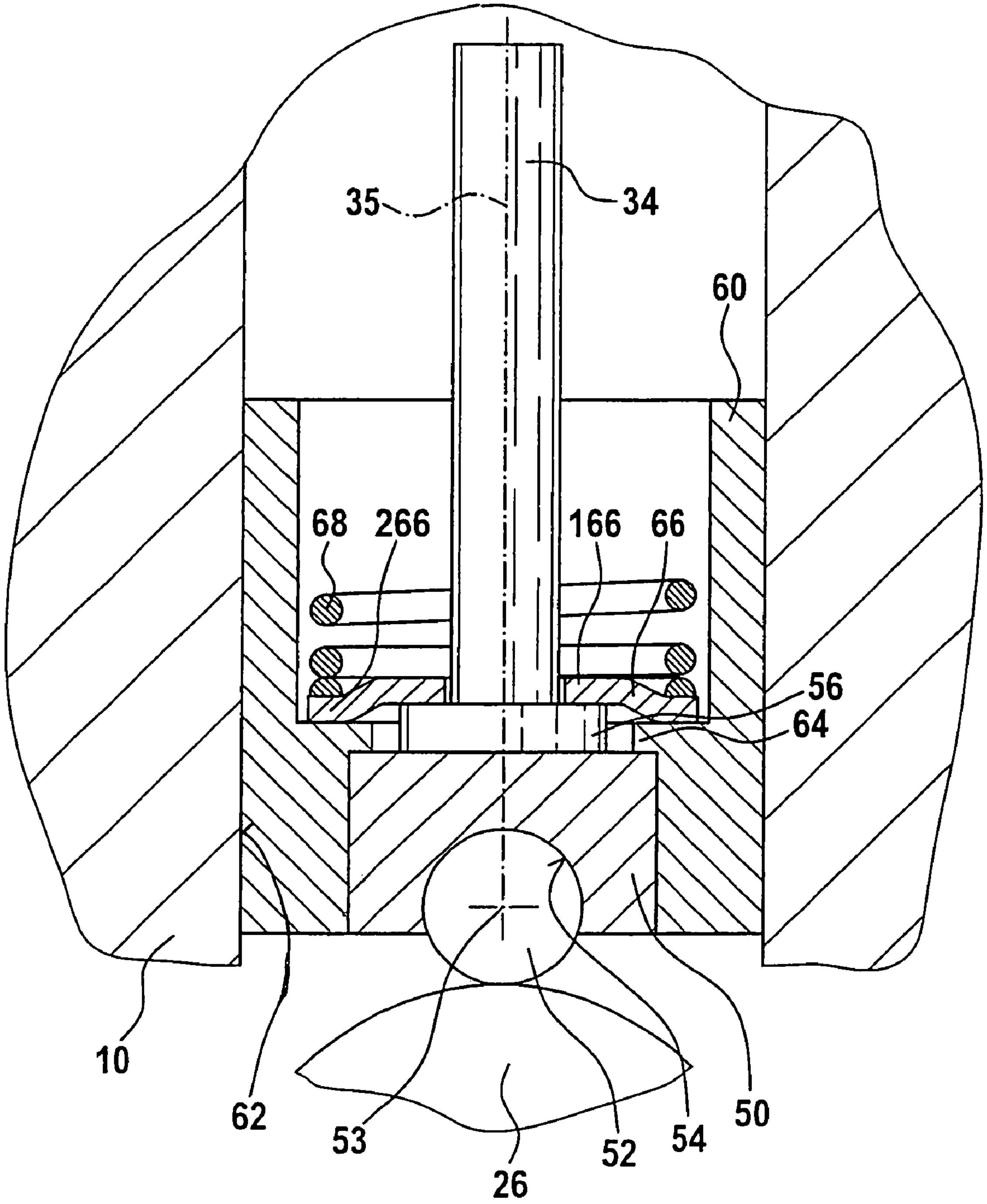

One exemplary embodiment of the invention is shown in the drawing and explained in further detail herein below, with reference to the drawings, in which:

FIG. 1 shows a sectional view of a fuel injection device of an internal combustion engine with a high-pressure pump in a longitudinal section; and FIG. 2 shows an enlargement of a detail, marked II in FIG. 1, of the high-pressure pump.

DESCRIPTION OF THE PREFERRED EMBODIMENT

In FIGS. 1 and 2, a high-pressure pump for a fuel injection device of an internal combustion engine is shown. The high-pressure pump has a housing 10, which is embodied in multiple parts and in which a drive shaft 12 is disposed. The drive shaft 12 is rotatably supported in the housing 10 via two bearing points, not shown but spaced apart from one another in the direction of the axis of rotation 13 of the drive shaft 12. The bearing points may be located in various parts of the housing 10.

In a region located between the two bearing points, the drive shaft 12 has a cam 26, which is embodied eccentrically to the axis of rotation 13 of the drive shaft; the cam 26 may be a multiple cam. The high-pressure pump has at least one, or more than one, pump element 32 located in the housing 10, each with its own pump piston 34, which is driven in a reciprocating motion by the drive shaft 12 via its cam 26 in an at least approximately radial direction to the axis of rotation 13 of the drive shaft 12 and along the longitudinal axis 35 of the pump piston. The pump piston 34 is guided tightly displaceably in a cylindrical bore 36 in the housing 10 or in an insert in the housing 10, and with its face end facing away from the drive shaft 12, it defines a pump work chamber 38 in the cylindrical bore 36. Via a fuel inlet conduit 40 extending in the housing 10, the pump work chamber 38 has a communication with a fuel supply, such as a feed pump. An inlet valve 42 opening into the pump work chamber 38 is located at the orifice of the fuel inlet conduit 40 into the pump work chamber 38 and has a spring-loaded valve member 43. The pump work chamber 38 furthermore has a communication, via a fuel outlet conduit 44 extending in the housing 10, with an outlet, which communicates for instance with a high-pressure reservoir 110. An outlet valve 46, which opens out of the pump work chamber 38 and likewise has a spring-loaded valve member 47, is located at the orifice of the fuel outlet conduit 44 into the pump work chamber 38. One or more injectors 120, located at the engine cylinders, communicate with the high-pressure reservoir 110, and through them fuel is injected into the cylinders of the engine.

The pump piston 34 is braced on the cam 26 of the drive shaft 12 via a support element 50 and a cylindrical roller 52 supported in it, on its side toward the drive shaft 12. The support element 50 is embodied approximately cylindrically, for instance, and has an indentation 54 in which the roller 52 is rotatably supported. The axis of rotation 53 of the roller 52 extends at least approximately parallel to the axis of rotation 13 of the drive shaft 12. The pump piston 34, on its end toward the support element 50, has a piston base 56 of increased diameter compared to the rest of the pump piston 34, and with the face end of its piston base 56, the pump piston 34 rests on the support element 50.

The support element 50 is inserted into a sleevelike tappet 60, which is guided displaceably in the direction of motion of the pump piston 34, or in other words in the direction of its longitudinal axis 35, in a bore 62 of the housing 10 of the high-pressure pump. The tappet 60 is embodied as hollow throughout and has an end region, toward the drive shaft 12, in which the support element 50 is received with slight play, which support element is adjoined, facing away from the drive shaft 12, by an inward-protruding annular collar 64 that fits over the support element 50 on its side facing away from the drive shaft 12.

A spring plate 66, which is braced on the piston base 56, is slipped over the pump piston 34 from the direction of its end that defines the pump work chamber 38. Between the spring plate 66 and the housing 10 of the high-pressure pump, there is a prestressed restoring spring 68, which is embodied for instance as a helical compression spring. The spring plate 66 rests with its central region 166 on the piston base 56 in the direction of the longitudinal axis 35 of the pump piston 34. With its peripheral region 266, the spring plate 66 rests, in the direction of the longitudinal axis 35 of the pump piston 34, in the tappet 60 on its annular collar 64, on the side facing away from the support element 50. The spring plate 66 is embodied as elastically deformable, in such a way that its peripheral region 266 is movable relative to its central region 166 in the direction of the longitudinal axis 35 of the pump piston 34. In FIG. 2, the spring plate 66 is shown in its elastically deformed state. In its undeformed outset state, the spring plate 66 can be embodied as flat, or it may already have a bend in its peripheral region 266, as shown in FIG. 2. The spring plate 66 may for instance be of sheet metal and preferably has a lesser stiffness than the restoring spring 68. By means of the restoring spring 68, via the spring plate 66, the pump piston 34 is kept with its piston base 56 in contact with the support element 50, and the support element is kept with its roller 52 in contact with the cam 26 of the drive shaft 12. Also by means of the restoring spring 68, via the spring plate tappet 66, the tappet 60 is kept with its annular collar 64 in contact with the support element 50. Because of the elastic deformability of the spring plate 66, its contact with both the piston base 56 and the annular collar 64 of the tappet 60 is assured, even if the contact faces for the spring plate 66 on the piston base 56 and on the annular collar 64 of the tappet 60 are offset from one another in the direction of the longitudinal axis 35 of the pump piston 34, as can be the case because of production tolerances of the individual components. Because of the greater stiffness of the restoring spring 68 compared to the spring plate 66, the elastic deformation of the spring plate 66 is achieved, so that the spring plate rests securely on both the piston base 56 and the annular collar 64 of the tappet 60.

In the intake stroke of the pump piston 34, in which the pump piston moves radially inward because of the restoring spring 68, the pump work chamber 38 is filled with fuel through the fuel inlet conduit 40 with the inlet valve 42 open and the outlet valve 46 closed. In the pumping stroke of the pump piston 34, in which it is moved radially outward by the cam 26 of the drive shaft 12 counter to the force of the restoring spring 68, fuel is pumped at high pressure by the pump piston 34 to the reservoir 110 through the fuel outlet conduit 44 with the outlet valve 46 open and the inlet valve 42 closed.

The foregoing relates to a preferred exemplary embodiment of the invention, it being understood that other variants and embodiments thereof are possible within the spirit and scope of the invention, the latter being defined by the appended claims.

The invention claimed is:

1. A high-pressure pump for a fuel injection device of an internal combustion engine, the pump comprising, at least one pump element, which has a pump piston that defines a pump work chamber and that is driven to a reciprocating motion at least indirectly by a drive shaft counter to force of a restoring spring, a sleevelike tappet bracing the pump piston at least indirectly on the drive shaft the restoring spring engaging at least the pump piston, a support element inserted into the tappet, on which support element the pump piston is braced toward the drive shaft and which support element is braced at least indirectly on the drive shaft, and the restoring spring engaging the pump piston and the tappet via a spring plate;

the spring plate being elastically deformable in the direction of motion of the pump piston such that by its elastic deformation, deviations in the position of its contact faces on the pump piston and on the tappet are compensated for.

2. The high-pressure pump in accordance with claim 1, wherein the tappet is kept in contact with the support element by the restoring spring.

3. The high-pressure pump in accordance with claim 2, wherein the tappet comprises a bearing face protruding inward into it, for the support element, with which bearing face the tappet comes to rest on the support element toward the drive shaft.

4. The high-pressure pump in accordance with claim 1, wherein the spring plate comprises a central region engaging the pump piston and a peripheral region engaging the tappet.

5. The high-pressure pump in accordance with claim 2, wherein the spring plate comprises a central region engaging the pump piston and a peripheral region engaging the tappet.

6. The high-pressure pump in accordance with claim 3, wherein the spring plate comprises a central region engaging the pump piston and a peripheral region engaging the tappet.

7. The high-pressure pump in accordance with claim 4, wherein the pump piston, on its end toward the support element, comprises a piston base of increased diameter compared to its remaining region, which piston base is engaged by the spring plate.

8. The high-pressure pump in accordance with claim 5, wherein the pump piston, on its end toward the support element, comprises a piston base of increased diameter compared to its remaining region, which piston base is engaged by the spring plate.

9. The high-pressure pump in accordance with claim 6, wherein the pump piston, on its end toward the support element, comprises a piston base of increased diameter compared to its remaining region, which piston base is engaged by the spring plate.

10. The high-pressure pump in accordance with claim 1, wherein the spring plate has a lesser stiffness than the restoring spring.

11. The high-pressure pump in accordance with claim 2, wherein the spring plate has a lesser stiffness than the restoring spring.

12. The high-pressure pump in accordance with claim 3, wherein the spring plate has a lesser stiffness than the restoring spring.

13. The high-pressure pump in accordance with claim 4, wherein the spring plate has a lesser stiffness than the restoring spring.

14. The high-pressure pump in accordance with claim 7, wherein the spring plate has a lesser stiffness than the restoring spring.

15. The high-pressure pump in accordance with claim 1, further comprising a roller which rolls on the drive shaft, the roller being rotatably supported in the support element, on its side toward the drive shaft.

16. The high-pressure pump in accordance with claim 2, further comprising a roller which rolls on the drive shaft, the roller being rotatably supported in the support element, on its side toward the drive shaft.

17. The high-pressure pump in accordance with claim 3, further comprising a roller which rolls on the drive shaft, the roller being rotatably supported in the support element, on its side toward the drive shaft.

18. The high-pressure pump in accordance with claim 4, further comprising a roller which rolls on the drive shaft, the roller being rotatably supported in the support element, on its side toward the drive shaft.

19. The high-pressure pump in accordance with claim 7, further comprising a roller which rolls on the drive shaft, the roller being rotatably supported in the support element, on its side toward the drive shaft.

20. The high-pressure pump in accordance with claim 15, further comprising a wear guard layer on the support element at least in the region of the bearing of the roller.

* * * * *